United States Patent
Murakami (10) Patent No.: US 7,747,077 B2
(45) Date of Patent: Jun. 29, 2010

(54) IMAGE PROCESSING APPARATUS, IMAGE PROCESSING METHOD, AND IMAGE PROCESSING PROGRAM

(75) Inventor: Waki Murakami, Tokyo (JP)

(73) Assignee: Canon Kabushiki Kaisha (JP)

(*) Notice: Subject to any disclaimer, the term of this patent is extended or adjusted under 35 U.S.C. 154(b) by 1097 days.

(21) Appl. No.: 11/354,206

(22) Filed: Feb. 14, 2006

(65) Prior Publication Data

US 2006/0197999 A1 Sep. 7, 2006

(30) Foreign Application Priority Data

Feb. 14, 2005 (JP) ............................. 2005-036859

(51) Int. Cl.
*G06K 9/34* (2006.01)
(52) U.S. Cl. .................................................... 382/180
(58) Field of Classification Search ................ 382/173, 382/175–180, 197, 199, 206, 282; 358/453, 358/462; 345/419–420, 619, 629
See application file for complete search history.

(56) References Cited

U.S. PATENT DOCUMENTS

| 5,353,403 | A | * | 10/1994 | Kohiyama et al. | .......... 345/563 |
| 5,581,796 | A | * | 12/1996 | Koga et al. | .................. 345/623 |
| 6,088,520 | A | * | 7/2000 | Taoka et al. | .................... 716/21 |
| 6,115,497 | A | * | 9/2000 | Vaezi et al. | ................. 382/174 |
| 6,483,519 | B1 | | 11/2002 | Long et al. | |
| 6,798,410 | B1 | | 9/2004 | Redshaw et al. | |

FOREIGN PATENT DOCUMENTS

| EP | 0-860-768 A1 | 8/1998 |
| JP | 04-170686 A | 6/1992 |
| JP | 2002-529871 A | 9/2002 |

* cited by examiner

*Primary Examiner*—Jose L Couso
(74) *Attorney, Agent, or Firm*—Rossi, Kimms & McDowell LLP (57) ABSTRACT

An image processing apparatus that are capable of reducing the time required for image formation processing to generate image data from drawing data. A block segmentation section determines an encompassing region encompasses an object to be drawn and determines whether or not each of segments into which one page is segmented in a grid pattern overlaps the encompassing region. Image processing sections process segment by segment an object encompassed by an overlapped encompassing region.

6 Claims, 5 Drawing Sheets

```
         newpath
       ⎧ 160 340 moveto           ⎫
  201  ⎨ 150 340 100 60 420 arc   ⎬―204
       ⎩ closepath                ⎭
         010 setrgbcolor ―205
         fill ―206
       ⎧ 180 280 moveto  ⎫
       ⎪ 120 70 lineto   ⎪
  202  ⎨ 315 170 lineto  ⎬―207
       ⎪ 180 280 lineto  ⎪
       ⎩ closepath       ⎭
         100 setrgbcolor ―208
         fill ―209
       ⎧ 30 20 moveto                ⎫
  203  ⎨ 85 120 140 20 160 60 curveto⎬―210
       ⎩ stroke                      ⎭
         showpage ―211
```

*FIG. 5*

| idx | code |
|---|---|
| 0 | POINTER TO CIRCLE OBJECT INFORMATION |
| 1 | POINTER TO TRIANGLE OBJECT INFORMATION |
| 2 | POINTER TO CURVE OBJECT INFORMATION |

FIG. 6

| | Block | index | |
|---|---|---|---|
| 601 | 0 | 0 | |
| 602 | 1 | 0 | |
| 603 | 2 | 0 | |
| 604 | 3 | | |
| 605 | 4 | 0 | |
| 606 | 5 | 0 | |
| 607 | 6 | 0 | |
| 608 | 7 | | |
| 609 | 8 | 0 | |
| 610 | 9 | 0 | 1 |
| 611 | 10 | 0 | 1 |
| 612 | 11 | 1 | |
| 613 | 12 | 2 | |
| 614 | 13 | 1 | 2 |
| 615 | 14 | 1 | |
| 616 | 15 | 1 | |
| 617 | 16 | 2 | |
| 618 | 17 | 1 | 2 |
| 619 | 18 | 1 | |
| 620 | 19 | 1 | |

IMAGE PROCESSING APPARATUS, IMAGE PROCESSING METHOD, AND IMAGE PROCESSING PROGRAM

BACKGROUND OF THE INVENTION

1. Field of the Invention

The present invention relates to an image processing apparatus, an image processing method, and an image processing program.

2. Description of the Related Art

Drawing data written in a Page Description Language (PDL) such as PostScript (registered trademark) or PDF (Portable Document Format) is input into an image forming section of an image forming apparatus or an apparatus solely used for image formation (hereinafter collectively referred to as the image forming apparatus). The input drawing data consists of a set of objects of different types (drawing objects to be drawn), including graphics, text, and other types of images. The drawing data is interpreted in the image forming apparatus and image data is generated for each page. Interpretation of drawing data in the image forming apparatus typically involves a large number of computations depending on the complexity of the data. In the image forming apparatus, image data for each page such as a raster image page or a compressed image is generated based on the drawing data. The image data generated on the image forming apparatus (e.g., the image forming section of the image forming apparatus) undergoes image processing such as page merging or rotation as required, which is performed by an image processing section of the image forming apparatus or an apparatus solely used for image processing, and is then sent to a printer engine and printed.

To increase the rate of printing, the time required for image formation and the time required for image processing must be minimized as much as possible.

Parallel processing in which image processing processes are performed in parallel and concurrently is effective for minimizing the time required for image processing. Examples of parallel processing include a method in which image data of multiple pages is processed in parallel on a page basis and a method in which a raster image output from the image forming apparatus is split into tiles, which are then processed in parallel.

Splitting a page image into tiles for parallel image processing is also known but has a problem that, when a horizontally oriented image is to be split, the image can be split only after all scan lines are provided.

The just-mentioned methods solely intended for high-speed processing of image data cannot increase the speed of image formation processing to form image data from drawing data, which is load-intensive processing.

Therefore, an approach has been devised in which the processes of image formation processing are parallelized to speed up image formation processing. For example, an apparatus has been disclosed which splits a drawing object into lines or strips in the horizontal direction and performs parallel processing on the horizontally split object to be drawn (see for example European Patent No. EP0860768). Another image processing apparatus has been disclosed which splits a two-dimensional region to be drawn into blocks (see for example Japanese Laid-Open Patent Publication (Kokai) No. H04-170686).

Yet another approach is to pipeline the processes of image formation processing (see U.S. Pat. No. 6,483,519).

However, the conventional image forming apparatuses that split an object to be drawn into horizontal lines or strips has a problem that processing for printing an image, in particular a horizontally long image, takes much time.

An alternate approach that is suitable for tile-based parallel processing to speed up image formation processing may be to segment drawing data into blocks. In such a case however, intersections of all the drawing objects to be drawn contained in a page and the boundary of each block must be precisely calculated in order to identify drawing objects contained in PDL data for each block. The calculation of intersections is sequential processing because the order in which the objects are drawn must be stored, resulting in a problem that the block segmentation involves much computations and requires much time.

SUMMARY OF THE INVENTION

An object of the present invention is to provide an image processing apparatus and an image processing method that are capable of reducing the time required for image formation processing to generate image data from drawing data, and an image processing program for implementing the image processing method.

To attain the above object, in a first aspect of the present invention, there is provided an image processing apparatus comprising an encompassing region determining device that determines an encompassing region that encompasses an object to be drawn, an overlap determining device that determines whether or not each of segments into which one page is segmented in a grid pattern overlaps the encompassing region, and an object processing device that processes segment by segment an object encompassed by an overlapped encompassing region.

Preferably, the overlap determining device determines whether each of the segments is one of at least one overlap segment each of which overlaps at least part of the encompassing region, and the object processing device processes the object to be drawn on an overlap segment by overlap segment basis.

More preferably, the object processing device has a plurality of object processing sections, and each of the plurality of object processing sections is capable of processing at least part of the object to be drawn that corresponds to the at least one overlap segment.

Preferably, the encompassing region is a polygon.

Preferably, the encompassing region determining device determines the encompassing region based on maximum and minimum values of coordinate values that define the object to be drawn.

To attain the above object, in a second aspect of the present invention, there is provided an image processing method comprising an encompassing region determining step of determining an encompassing region that encompasses an object to be drawn, an overlap determining step of determining whether or not each of segments into which one page is segmented in a grid pattern overlaps the encompassing region, and an object processing step of processing segment by segment an object encompassed by an overlapped encompassing region.

Preferably, the encompassing region is a polygon.

Preferably, the encompassing region determining step determines the encompassing region based on maximum and minimum values of coordinate values that define the object to be drawn.

To attain the above object, in a third aspect of the present invention, there is provided an image processing program comprising an encompassing region determining module for determining an encompassing region that encompasses an object to be drawn, an overlap determining module for determining whether or not each of segments into which one page is segmented in a grid pattern overlaps the encompassing region, and an object processing module for processing segment by segment an object encompassed by an overlapped encompassing region.

Preferably, the encompassing region is a polygon.

Preferably, the encompassing region determining module determines the encompassing region based on maximum and minimum values of coordinate values that define the object to be drawn.

According to the present invention, the processing time required for generating image data from drawing data can be reduced, and, especially time for processing a horizontally oriented image can be reduced by vertically dividing the horizontally oriented image into blocks for parallel processing.

The above and other objects, features, and advantages of the invention will become more apparent from the following detailed description taken in conjunction with the accompanying with drawings.

DETAILED DESCRIPTION OF THE PREFERRED EMBODIMENTS

The present invention will now be described in detail with reference to the drawings showing a preferred embodiment thereof.

Figure 1:
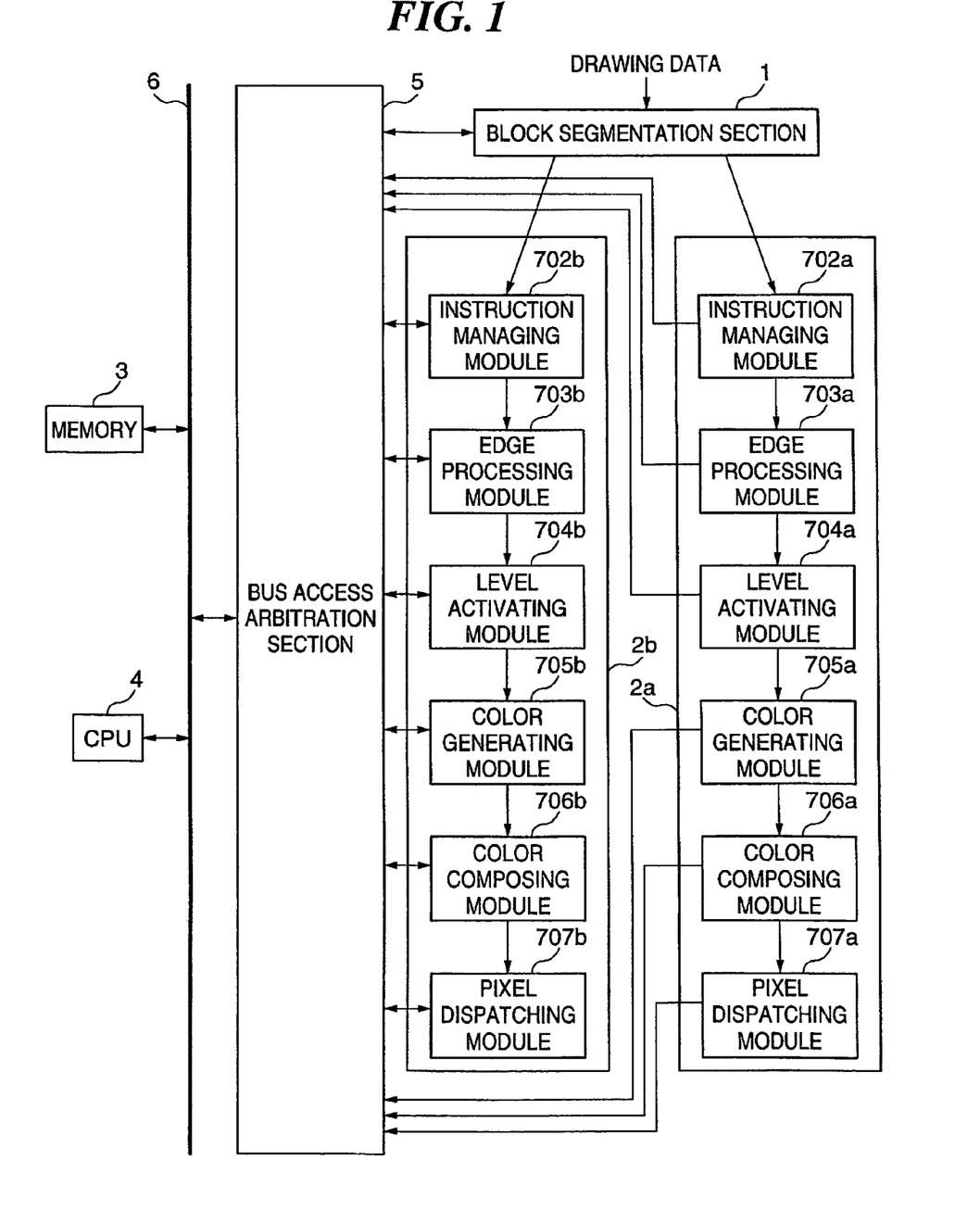
FIG. 1 is a block diagram schematically showing an image processing apparatus according to one embodiment of the present invention.

FIG. 1 is a block diagram schematically showing a configuration of an image processing apparatus according to an embodiment of the present invention.

Input into the image processing apparatus is drawing data (PDL data) written in a Page Description Language (PDL) such as PostScript or PDF. The image processing apparatus generates image data for each page based on input drawing data. The image processing apparatus processes PDL data converted into an intermediate language format by software, not shown. A set of PDL data converted into an intermediate language format is defined herein as a job and a manipulation instruction included in the data in an intermediate language format is defined as a drawing command (drawing instruction). In a job, for example, objects to be drawn contained original PDL data are sorted in ascending order along a vertical scan line (in the Y-coordinate direction) and described in the job. The job also includes an edge table, a level table, and a fill table. The edge table contains information about the edges of objects to be drawn. The level table contains level information indicating respective levels assigned to edges of objects to be drawn, and other information. The fill table contains information for determining colors in objects to be drawn.

The image processing apparatus according to the present embodiment shown in FIG. 1 includes a block segmentation section 1 as an input processing section, two image processing sections (drawing sections) 2a, 2b, and a memory 3 in which drawing object information, page image data and the like are written, a CPU 4, a bus access arbitration section 5, and a system bus 6. Image processing section 2a includes modules denoted by reference numeral 702a-707a, which will be described later, and image processing section 2b includes modules denoted by reference numeral 702b-707b, which will be described later. Modules denoted by reference numeral 702a-707a and modules denoted by reference numeral 702b-707b perform pipeline processing (described later) and hence hereinafter sometimes referred to as pipeline modules. While an implementation having two image processing sections 2a, 2b will be described herein, the image processing apparatus may have more than two image processing sections.

Instruction managing modules 702a, 702b access the system bus 6 to read a job and issue a drawing command to pipeline modules 703a-706a and 703b-706b, which will be described later.

Edge processing modules 703a, 703b read edge records included in a job in accordance with a drawing command issued by the instruction managing modules 702a, 702b and extract edge information of objects to be drawn on a scan-line-by-scan-line basis. The edge processing modules 703a, 703b sort the edge information in ascending order along each scan line (in the X-coordinate direction) and then transfer the edge information to level activating modules 704a, 704b as a message.

In accordance with a drawing command issued by the instruction managing modules 702a, 702b, the level activating modules 704a, 704b read the level table included in a job and edge information transferred from the edge processing modules 703a, 703b. The level activating modules 704a, 704b then determines the priority of level of each edge of one or more drawing objects (if any) for every scan line and an active pixel range (affecting drawing of each edge). Also, the level activating modules 704a, 704b sort pieces of active pixel range information for each scan line in priority order, and transfer the active pixel range information and other information to color generating modules 705a, 705b, as pixel range information with level priority.

In accordance with a drawing command issued by the instruction managing module 702a, 702b, the color generating modules 705a, 705b read the fill table included in a job and pixel range information transferred from the level activating modules 704a, 704b. The color generating modules 705a, 705b then determine the color of active pixels for every level (for every drawing object) and transfer the determined active pixel color information to color composing modules 706a, 706b together with pixel range information transferred from the level activating modules 704a, 704b.

The color modules 706a, 706b perform calculations based on pixel range information for each level and pixel color information in accordance with a drawing command issued by the instruction managing modules 702a, 702b to determine the color of each pixel and generates the ultimate colors of the pixels. As mentioned in the above, the pixel range information of each level is generated by the level activating modules 704a, 704b and the pixel color information is determined by the color generating modules 705a, 705b.

Pixel dispatching modules 707a, 707b expands pixel color information over pixels, wherein the pixel color information represents in run-length form the ultimate pixel colors generated by the color composing modules 706a, 706b and send the thus expanded pixel color information to an external device connected.

The internal modules (instruction managing modules 702a, 702b, edge processing modules 703a, 703b, level activating modules 704a, 704b, color generating modules 705a, 705b, color composing modules 706a, 706b, and pixel dispatching modules 707a, 707b) in the block segmentation section 1 and the image processing sections 2a, 2b are preferably implemented as separate processors or dedicated hardware modules. However, more than one module out of these modules, for example the edge processing modules 703a, 703b and the level activating modules 704a, 704b, or the whole image processing sections 2a, 2b may be implemented for parallel or concurrent execution by software or a reconfigurable architecture.

While the configuration shown in FIG. 1 includes only one block segmentation section 1, a plurality of block segmentation sections may alternatively be provided for parallel operation. In that case, multiple pages or multiple portions making up of PDL data for one page may be assigned to different block segmentation sections. PDL data for one page may be divided at the break point between objects to be drawn, for example between drawing instructions respectively denoted by reference numerals 206 and 207 in PDL data for one page shown in FIG. 2. Then the divided PDL data are assigned to the block segmentation sections, respectively. After block segmentations in all block segmentation sections are completed, drawing commands for the blocks having drawing object information associated therewith are generated in the order in which the PDL data are assigned. Thus, the order in which the objects are to be drawn can be retained.

Returning to FIG. 1, the block segmentation section 1 receives PDL data (drawing data) and interprets the PDL data according to the PDL rules. The block segmentation section 1 in the present embodiment has the function of executing non-drawing instructions, the function of extracting drawing instructions (command set) for every drawing object, and the function of storing pieces of information about drawing objects themselves and the correspondence information between the drawing objects and blocks into the memory 3. The term "blocks" as used herein refers to segmented areas (segments) that can be obtained by dividing one page into a grid pattern. These blocks are predefined in the image processing apparatus. The block segmentation section 1 has the following two functions. One is the function of processing instructions other than object drawing instructions in PDL data; the other is the function of extracting a drawing instruction for each drawing object, obtaining information about a region in which the drawing object is likely to be included (hereinafter referred to as the "approximate frame region"), and associating drawing object information with the blocks defined in the image processing apparatus.

The block segmentation section 1 performs processing other than object drawing, such as status setting, status restoration, variable management, calculations between variables, branching and iteration, and procedure calling that are specified in PDL data. It should be noted that drawing data may be directly input into the block segmentation section 1 or a pre-generated job may be invoked and used to input drawing data into the block segmentation section 1. The block segmentation section 1 may be allowed to interpret more than one piece of PDL data.

Typically, drawing data (PDL data) input into the block segmentation section 1 represents drawing operations such as filling a closed area surrounded by a straight line or curve, manipulating a drawing object such as a straight line or curve itself, and characters. The block segmentation section 1 defines regions in which such objects to be drawn exist by using coordinates information extracted from drawing instructions included in drawing data. In order to reduce processing time, the block segmentation section 1 performs the processing as follows. For objects such as a circle or curve, for which calculation of the coordinates of the intersection of the object and a block boundary is complex, a region in which the drawing object is likely to exist (approximate frame region) is first determined from coordinate information extracted from the drawing data. Then, a drawing object to be associated with a given block is selected according to whether the block in question includes at least part of the approximate frame region for the drawing object. For example, a triangle drawing object surely exists in a rectangular region (approximate frame region) surrounded by the maximum and minimum X and Y coordinate values among the X and Y coordinate values of its three vertexes. For a Bezier curve, if four control points defining the Bezier curve can be obtained, the region in which the Bezier curve exists can also be determined as a region surrounded by straight lines each passing through a corresponding one of the control points.

As has been described above, a region including a whole drawing object is used as an approximate frame region. The approximate frame region may be determined by using any other method, on condition that no part of the drawing object should lie off the approximate frame region. In the present embodiment, an approximate frame region is defined as a rectangle encompassing a whole object to be drawn. By limiting an approximate frame region to a rectangle, blocks including at least part of the approximate frame region for a drawing object can be determined with simple interpretation.

Drawing object information generated as described above and associated with each of the blocks concerned is converted by the CPU 4 into an intermediate language format required by the image processing sections 2a, 2b for image formation. While only one CPU 4 is provided in the image processing apparatus shown in FIG. 1, a plurality of CPUs may be provided. Furthermore, the block segmentation section 1 may include the function of generating an intermediate language.

The instruction managing modules 702a, 702b use drawing object information for one or more blocks that are delivered from the CPU 4 to generate drawing commands (in the intermediate language format) to be executed by the image processing sections 2a, 2b. The drawing commands include information about the shape, the color, and drawing format of the drawing object or pointers to these items of information.

The image processing sections 2a, 2b receive the drawing commands output from the block segmentation section 1 and generate a page image according to the drawing commands. The image data generated in the image processing sections 2a, 2b is stored in the memory 3. Alternatively, the image data may be directly transferred to an image processing device, output device, display device, or other device in the subsequent stage.

Figure 2:
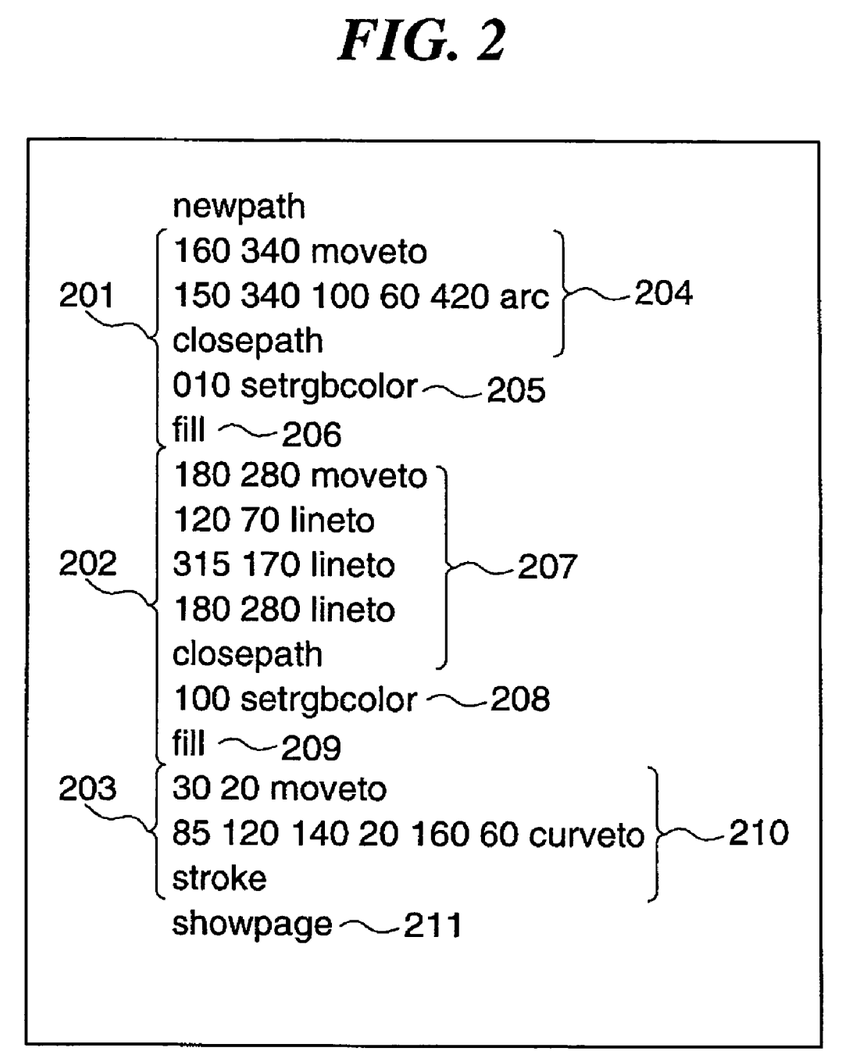
FIG. 2 is a view showing an example of drawing data written in PostScript language and input into a block segmentation section of the image processing apparatus shown in FIG. 1.
Figure 3:
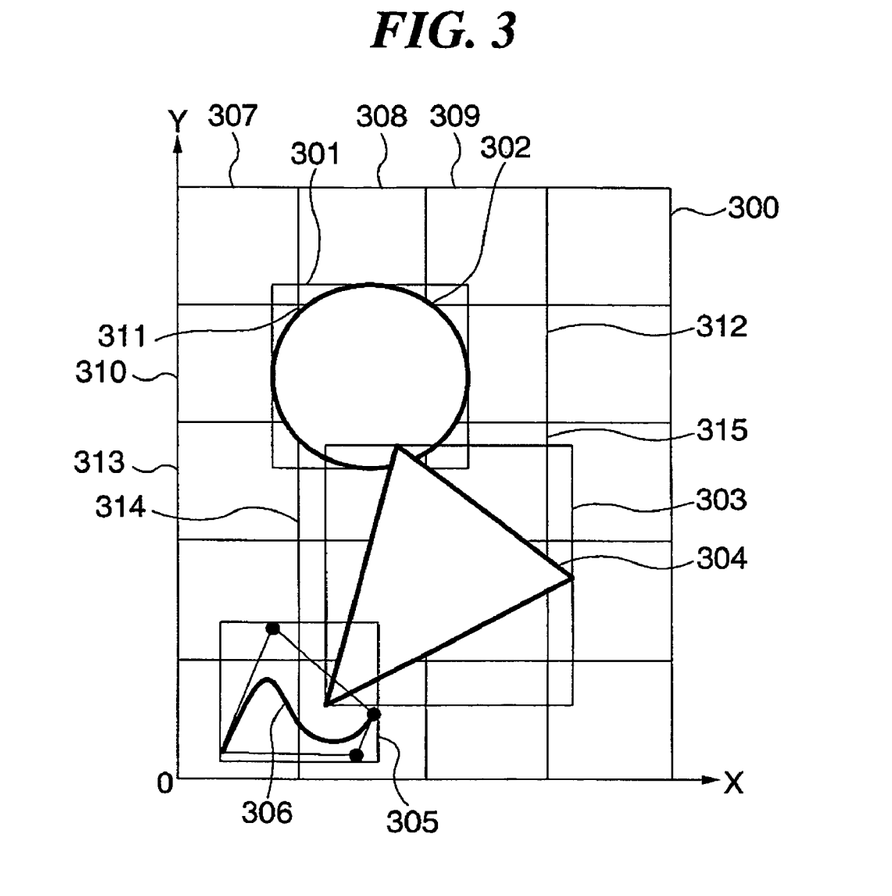
FIG. 3 is a view showing a page image drawn in accordance with the drawing data shown in FIG. 2.

FIG. 2 shows an example of drawing data written in PostScript language to be input into the block segmentation section 1 of the image processing device shown in FIG. 1. FIG. 3 shows an image drawn in accordance with the drawing data of FIG. 2.

Reference numerals 201, 202, and 203 in FIG. 2 denote object drawing instructions with which a circle object 302, a triangle object 304, and a curve object 306 in FIG. 3, respectively, are drawn.

Figure 4:
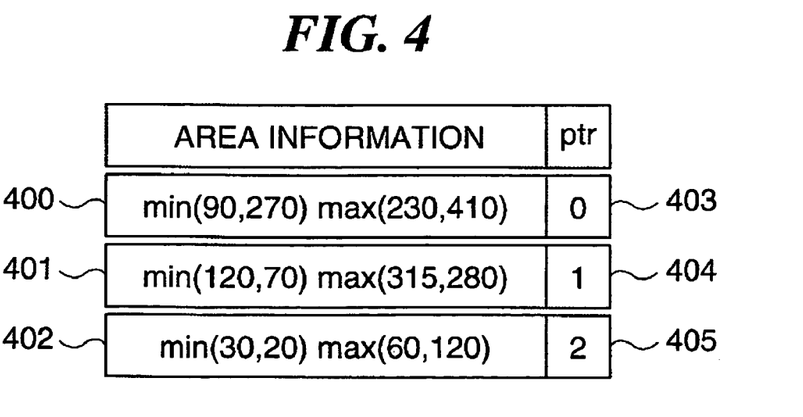
FIG. 4 is a table showing approximate frame regions of circle, triangle, and curve objects.
Figure 5:
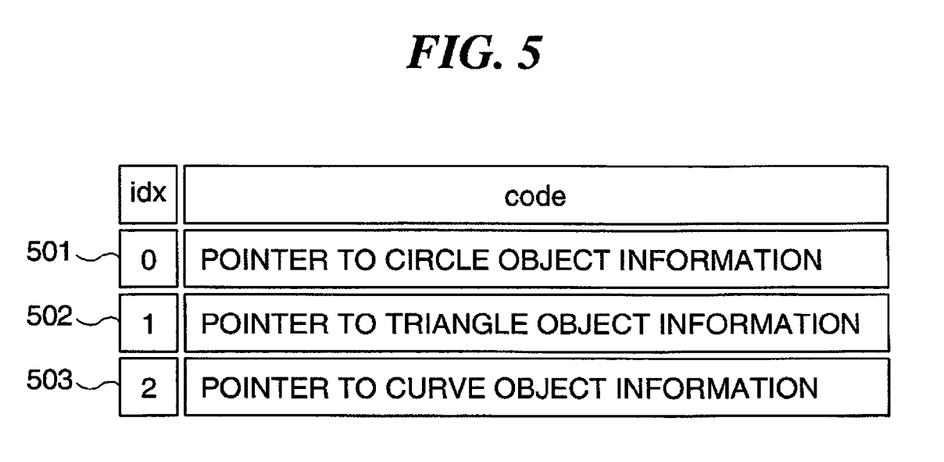
FIG. 5 is a drawing object table containing information about the objects to be drawn.
Figure 6:
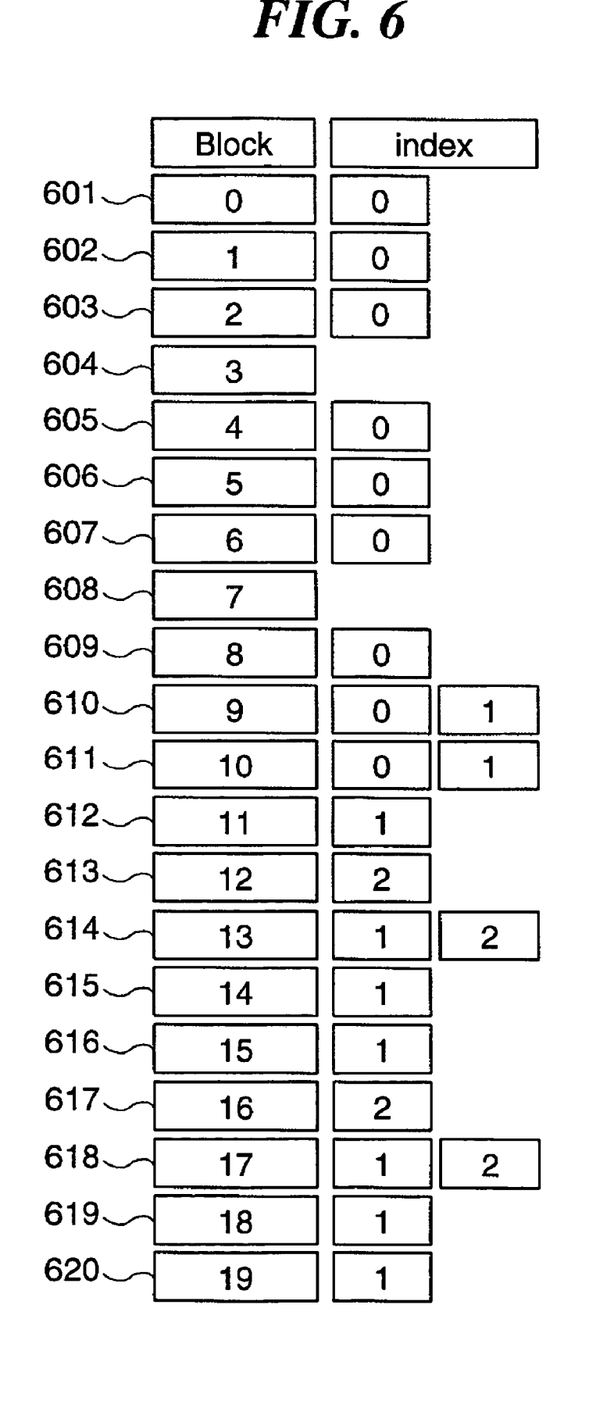
FIG. 6 is a correspondence table showing the correspondence between blocks and objects to be drawn.

FIGS. 4, 5, and 6 show an example of drawing object information generated by the block segmentation section 1. In FIG. 4, a table is shown in which approximate frame regions of the circle object 302, triangle object 304, and curve object 306 are indicated. FIG. 5 shows a drawing object table in which drawing object information are stored. FIG. 6 is a correspondence table in which correspondence between blocks and drawing objects is shown.

The block segmentation section 1 generates the drawing object table (FIG. 5) and the correspondence table (FIG. 6) and then notifies the CPU 4 of the completion of the generation of tables. The CPU 4 refers to these two tables and converts the drawing object information included in one or more blocks into an intermediate language format, then allocates the converted drawing object information to the image processing sections 2a, 2b.

Operation of the block segmentation section 1 will be described below with reference to the PDL data shown by way of example in FIG. 2.

Description part 204 shown in FIG. 2 defines the shape of an object to be drawn. Here, a circle object 302 centered at the coordinate (160, 340) and having a radius of 70 is defined. The block segmentation section 1 records the circle object 302 in the drawing object table (FIG. 5). More specifically, the circle object 302 is assigned index (idx) 0 and is recorded in entry 501 of the drawing object table, and a pointer to the drawing instruction 201 of the circle object 302 is also recorded in entry 501. While the drawing object information recorded in the drawing object table is the pointer to PDL data in this example, drawing data of the drawing object may be actually copied to the table, or the drawing data may be transformed into an appropriate format and then recorded in the table.

After the completion of interpretation of the description part 204, the block segmentation section 1 calculates, from the coordinate of the center (160, 340) and the radius 70, of the circle object 302, the range of X and Y coordinates that the circle object 302 described by the description part 204 can take. The range corresponds to a rectangular region 301 (approximate frame region) shown in FIG. 3. The minimum values of the X- and Y-coordinates that define the circle object 302 are (X, Y)=(160−70, 340−70) =(90, 270) and similarly, the maximum values are (X, Y)=(160+70, 340+70)=(230, 410). These values are recorded in entry 400 of the table shown in FIG. 4 as representing the approximate frame region of the circle object 302. A value of 0 which corresponds to index (idx) 0 of the circle object 302 is also recorded in the pointer (ptr) 403 of entry 400.

Once the rectangle 301 has been obtained, one or more blocks each including at least part of the rectangle 301 (here, blocks 307, 308, 309, 310, 311, 312, 313, 314, and 315) are determined by coordinate-based calculation, out of all of the twenty blocks in a drawing area 300 shown in FIG. 3. It is determined that these blocks are each likely to include part of circle object 302. Based on the result of this determination, the correspondence table shown in FIG. 6 is prepared.

The correspondence table in FIG. 6 shows the relation between each of the blocks (segmented areas) of the drawing area 300 and each of drawing objects to be drawn on the drawing area 300. In other words, the correspondence table indicates in which one or more of the blocks at least part of the approximate frame region of each drawing object is included.

As shown in FIG. 6, the correspondence table includes entries respectively corresponding to the blocks of the drawing area 300 shown in FIG. 3. These entries are each provided with columns "Block" and "index". The block numbers ("Block") indicated in column "Block" are numbers assigned to the blocks in the drawing area 300. Block numbers 0, 1, 2, 3, . . . are assigned, starting from the upper-left block, proceeding to the right (in the positive X-direction), then downwards (in the negative Y-direction) left to right.

The blocks 307, 308, 309, 310, 311, 312, 313, 314, and 315 that are each likely to include at least part of the rectangle 301 for the circle object 302 have been determined as described above.

As shown in FIG. 6, these blocks respectively correspond to the entries 601-603, 605-607 and 609-611 and the block numbers 0-2, 4-6 and 8-10. A value of 0 recorded in pointer (ptr) 403 of entry 400 of the circle object 302 shown in FIG. 4 is copied to the column "index" of each entry.

Description part 205 shown in FIG. 2 specifies a color used for drawing the circle object 302, which is green (010) in this example.

Description part 206 instructs to fill the closed area of the circle object 302 with green, which color is specified in description part 205.

In description part 207, the shape of the triangle object 304 shown in FIG. 3 is defined. First, a move to instruction moves the pen coordinate to a coordinate (X, Y)=(180, 280). In accordance with a line to instruction, a straight line is drawn from this position to a coordinate (120, 70) and from this coordinate to a coordinate (315, 170) and to a coordinate (180, 280), thereby drawing a triangle.

As with the case of description part 204, the block segmentation section 1 records the triangle object 304 in the drawing object table (FIG. 5). Specifically, the triangle object 304 is assigned index (idx) 1 and recorded in entry 502 of the drawing object table, and a pointer to the drawing instruction 202 to draw the triangle object 304 is recorded in entry 502.

The triangle represented by description part 207 is a graphic made up of straight lines. Accordingly, the block segmentation section 1 identifies a region (approximate frame region) that encompasses the triangle object 304 by simply continuing updating the maximum and minimum values of X and Y coordinates that define the triangle object 304 until it completes interpretation of description part 207. The approximate frame region obtained in this way is a rectangle region 303 shown in FIG. 3. It can be determined from the coordinates of the three vertexes that the minimum values of X- and Y-coordinates are (X, Y)=(120, 70) and the maximum values are (X, Y)=(315, 280). The block segmentation section 1 records these values in entry 401 in the table shown in FIG. 4 as the values representing the approximate frame region of the triangle object 304. Also, a value of 1 which corresponds to index (idx) 1 of the triangle object 304 is recorded in pointer (ptr) 404 of entry 401.

After the approximate frame region of the triangle object 304 is determined, the correspondence table shown in FIG. 6 is updated. The rectangle 303 shown in FIG. 3 overlaps the blocks respectively associated with block numbers 9-11, 13-15 and 17-19 and entries 610-612, 614-616 and 618-620 shown in FIG. 6. Accordingly, the value, 1, recorded in pointer (ptr) 404 of entry 401 of the triangle object 304 shown in FIG. 4 is copied to the column "index" of these entries of the correspondence table shown in FIG. 6.

Description part 208 shown in FIG. 2 defines the color of the triangle object 304. Here, red (100) is specified.

Description part 209 instructs to fill the closed area of the triangle object 304 with red, which color is specified in the description part 208.

Description part 210 instructs to draw a Bezier curve 306 shown in FIG. 3. First, the pen is moved to a coordinate (30, 20), then a Bezier curve is drawn that is surrounded by four points, i.e., the current pen coordinate and coordinates (85, 120), (160, 60), and (140, 20).

As with the case of the description parts 204 and 207, the block segmentation section 1 records the Bezier curve 306 in the drawing object table (FIG. 5). Specifically, the Bezier curve 306 is assigned index (idx) 2 and recorded in entry 503 of the drawing object table, and a pointer to a drawing instruction 203 to draw the Bezier 306 is recorded in entry 503.

As with the case of the triangle object 304, a rectangle region 305 (approximate frame region) encompassing the Bezier curve 306 represented by description part 210 can be found from the minimum and maximum values of X- and Y-coordinates of control points that define the Bezier curve 306. That is, the approximate frame region encompassing the Bezier curve 306 is the rectangle 305 with the minimum and maximum X- and Y-coordinate values (X, Y)=(30, 20) and (160, 120). The block segmentation section 1 records these values in entry 402 of the table shown in FIG. 4 as the values representing the approximate frame region of the 15 Bezier curve 306. A value of 2, which corresponds to index (idx) 2 of the Bezier curve 306, is also recorded in pointer (ptr) 405 of the entry 402.

After the approximate frame region of the Bezier curve 306 is determined, the correspondence table shown 20 in FIG. 6 is updated. The rectangle 305 shown in FIG. 3 overlaps the blocks that are respectively associated with block numbers 12, 13, 16 and 17 and entries 613, 614, 617 and 618 shown in FIG. 6. Accordingly, the value, 2, recorded in pointer (ptr) 405 of entry 402 of 25 the Bezier curve 306 shown in FIG. 4 is copied to the column "index" of these entries of the correspondence table shown in FIG. 6.

Description part 211 shown in FIG. 2 indicates an instruction to output the graphics generated by the processing specified by the drawing instructions 201, 202, and. 203 as one page image. With this instruction, the drawing block segmentation section 1 detects the completion of drawing of the one page image.

After the completion of drawing, the block segmentation section 1 notifies the CPU 4 of the completion of the page. It also provides the generated drawing object table (FIG. 5) and correspondence table (FIG. 6) to the CPU 4.

In the foregoing description, a case where the approximate frame regions (encompassing regions) of drawing objects can be obtained has been described. If it is difficult to determine an appropriate approximate frame region of a complex-shaped drawing object, it is also difficult to segment the drawing object into blocks by using an approximate frame region. Also, if the fill-rule of a drawing object is complex and therefore is difficult to determine an appropriate approximate frame region of the drawing object, it is difficult to segment the drawing object into blocks by using an approximate frame region. In these cases, determination of the region encompassing a complex-shaped object can be omitted by unconditionally associating drawing object information with all blocks that are likely to include the drawing object.

The description of a graphic in PostScript language consists of the definition of the graphic to be drawn, the designations of options in the drawing processing, such as color, and of the type of drawing, and an instruction to execute drawing. Once the block segmentation section 1 interprets the execute instruction and generates a correspondence table and a drawing object table, dependencies between blocks can be resolved. At this time point, a block may have drawing object information that is not actually drawn. For example, block 307 shown in FIG. 3 has drawing object information about the circle object 302 that is not actually drawn. Such unnecessary drawing object information is removed in the edge processing modules 703a, 703b of the image processing sections 2a, 2b when exact intersections of the drawing object, scan lines, and block boundaries are calculated. Because one or more blocks in each of which at least part of a drawing object exists always have drawing object information, the drawing object can be properly drawn even if the drawing object covers the entirety of at least one block.

The block-by-block drawing object information thus generated is provided from the CPU 4 to the image processing sections 2a, 2b. Thus, the image processing sections 2a, 2b can generate page information on a block-by-block basis.

As for the supply of drawing object information from the CPU 4, there are a variety of methods for determining which one or more of the blocks should be assigned to each of the image processing sections 2a, 2b. By way of example, for a case where one page is divided into twenty blocks as shown in FIG. 3, ten blocks on the left side and the remaining ten blocks on the right side in FIG. 3 may be made correspond to the image processing sections 2a, 2b. Alternatively, one or more blocks (overlapping segmented areas) that overlap the entirety or part of an encompassing region (approximate frame region) for a given drawing object may be assigned to the image processing section 2a, and one or more remaining blocks may be assigned to the image processing section 2b.

According to the embodiment described above, a horizontally long image can be vertically segmented into blocks and then processed in parallel. This can reduce processing time.

Furthermore, if a drawing image is divided into tiles in an external device upstream of the image processing apparatus, identifiers (IDs) can be assigned to the tiles of the drawing image in the external. device, so that the image processing apparatus may start drawing data-based image forming processing before the external device outputs the entire drawing data of one page, resulting in the overall processing time being shortened.

The image forming apparatus according to the above embodiment can reduce time required for obtaining the intersections of a drawing object and blocks, compared with conventional image forming apparatuses.

Further, according to the above embodiment, even a drawing object that entirely covers one or more blocks can be properly drawn since a region (approximate frame region) encompassing the drawing object is used to assign respective drawing object parts to corresponding objects.

Moreover, according to the above embodiment, one or more blocks (overlapping blocks) that each include and overlap at least part of an encompassing area that encompasses a drawing object (approximate frame region) can be determined with a simple computation. Therefore, the time required for determining in which one or ones of the objects a drawing object exits can be reduced and the drawing object can be readily allocated to the overlapping blocks upon interpretation of PDL data.

Furthermore, according to the above embodiment, ranges appearing on one page, for which drawings must be made by the image processing sections 2a and 2b, become narrow in size. Therefore, blocks for which drawing object information must be handled can be reduced in number and accordingly memory capacity used during the drawing can be saved.

It is to be understood that the object of the present invention may also be accomplished by supplying a system or an apparatus with a storage medium in which a program code of software, which realizes the functions of either of the above described embodiment is stored, and causing a computer (or CPU, MPU and the like) of the system or apparatus to read out and execute the program code stored in the storage medium.

In this case, the program code itself read from the storage medium realizes the functions of the above described embodiment, and hence the program code and a storage medium on which the program code is stored constitute the present invention.

Examples of the storage medium for supplying the program code include a floppy (registered trademark) disk, a hard disk, a magnetic-optical disk, an optical disk including a CD-ROM, a CD-R, a CD-RW, a DVD-ROM, a DVD-RAM, a DVD-RW, and a DVD+RW, a magnetic tape, a nonvolatile memory card, and a ROM. Alternatively, the program code may be downloaded via a network.

Further, it is to be understood that the functions of the above described embodiment may be accomplished not only by executing a program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code. The form of the program may be an object code, a program code executed by an interpreter, or a script data supplied to an OS (Operating System).

While the present invention has been described with respect to a preferred embodiment, the present invention is not limited to the above embodiment. Various variations can be made within the scope of the accompanying claims.

This application claims the benefit of Japanese Patent Application No. 2005-036859, filed Feb. 14, 2005, which is hereby incorporated by reference herein in its entirety.

What is claimed is:

1. An image processing apparatus comprising:
   a calculator adapted to calculate information about a region of each drawing object based on drawing data;
   a recorder adapted to record a pointer to each drawing object in an index of each block generated by dividing a page of a correspondence table into tiles based on the information about the region, the correspondence table showing correspondence between each block and each drawing object; and
   an image processor device adapted to generate an image data on each block based on the correspondence table provided after completion of a processing for one page image.

2. The image processing apparatus according to claim 1, further comprising an output unit adapted to output the image data generated by said image processor device.

3. The image processing apparatus according to claim 1, wherein said image processor device is provided with a plurality of image processing sections.

4. An image processing method comprising:
   a calculation step of calculating information about a region of each drawing object based on drawing data with a calculator;
   a recording step of recording a pointer to each drawing object in an index of each block generated by dividing a page of a correspondence table into tiles based on the information about the region with a recorder, wherein the correspondence table shows a correspondence between each block and each drawing object; and
   an image processing step of generating an image data on each block based on the correspondence table provided after completion of a processing for one page image with an image processor device.

5. The image processing method according to claim 4, further comprising an transferring step of transferring the image data generated in said image processing step to an output unit.

6. The image processing method according to claim 4, wherein the image data is generated by a plurality of image processing sections of the image processor device in said image processing step.

* * * * *